Feb. 22, 1938.   J. D. RYDER   2,109,222
MEASURING AND CONTROLLING APPARATUS
Filed March 31, 1934    4 Sheets-Sheet 1

INVENTOR
John D. Ryder
BY
Raymond D. Junkins
ATTORNEY

Feb. 22, 1938. J. D. RYDER 2,109,222
MEASURING AND CONTROLLING APPARATUS
Filed March 31, 1934 4 Sheets-Sheet 2

INVENTOR
John D. Ryder
BY
Raymond D. Junkin
ATTORNEY

Patented Feb. 22, 1938

2,109,222

UNITED STATES PATENT OFFICE 2,109,222

MEASURING AND CONTROLLING APPARATUS

John D. Ryder, Cleveland Heights, Ohio, assignor to Bailey Meter Company, a corporation of Delaware Application March 31, 1934, Serial No. 718,427

30 Claims. (Cl. 236—69)

The present invention relates to apparatus for measuring and/or controlling the magnitude of a variable quantity, quality or condition, and particularly such variables as temperature, pressure, rate of fluid flow, etc., although the variable may be of any chemical, electrical, thermal, physical or other nature or characteristic.

According to the invention, I produce an electrical effect varying in known proportion to the magnitude, or to the variation in magnitude, of a variable whose magnitude or variation from predetermined value I desire to measure and/or control. Such electrical effect may be a small force such as an electromotive force produced by a thermocouple, and may be magnified to any desired degree to perform useful work. The electrical effect may be representative of the difference in magnitude of two independent variables, whereby the magnitude of one of the independent variables may be determined and/or controlled.

A primary object of my invention is to provide a measuring apparatus capable of exhibiting variations in the actual magnitude of a condition or variable substantially instantaneously with the occurrence of such variations and so that an observer will be advised of the magnitude of the condition at any time existing, and not of the magnitude which existed at some time previously, except insofar as such condition might be recorded for permanent record. In other words, to avoid a time delay between the occurrence of a change in magnitude and the presentation of such change for observation upon a measuring instrument or as applied to control apparatus.

One object of the invention is to provide apparatus and arrangement of the character referred to, wherein the deflections of a galvanometer or other sensitive device may be utilized in the control of reversing motors for recording and/or controlling.

Another object is to provide measuring apparatus wherein no appreciable work is required of the galvanometer, millivolt meter, milliammeter or other instrument deflecting in accordance with variations in the electrical effect indicative of changes in the magnitude of the condition. I preferably use in my preferred embodiment of the invention the null method of galvanometer-potentiometer circuit, although such is not essential to the operation of the invention.

A still further object is to provide apparatus of this type, wherein a variable to be measured is continuously recorded, in contradistinction to measuring apparatus at present in commercial usage which is of the periodically actuated or step-by-step type wherein the value of the variable or condition is indicated or recorded only periodically and not continuously. Such improvement predicates the substantially instantaneous advising of the value of variables as compared to the introduction of a time delay in waiting for periodic mechanisms to be actuated.

An important object of the invention is the inclusion of an anti-hunting means tending to allow maximum speed of control with a minimum of overtravel or hunting.

A further object is to so arrange the control circuit that control of either a floating or positioning characteristic may be obtained.

Still further objects will become apparent from the drawings and the description relating thereto in connection with preferred embodiments which I have chosen as representative, and wherein variable temperature in the operation of a heating furnace is measured and controlled.

Figure 1:
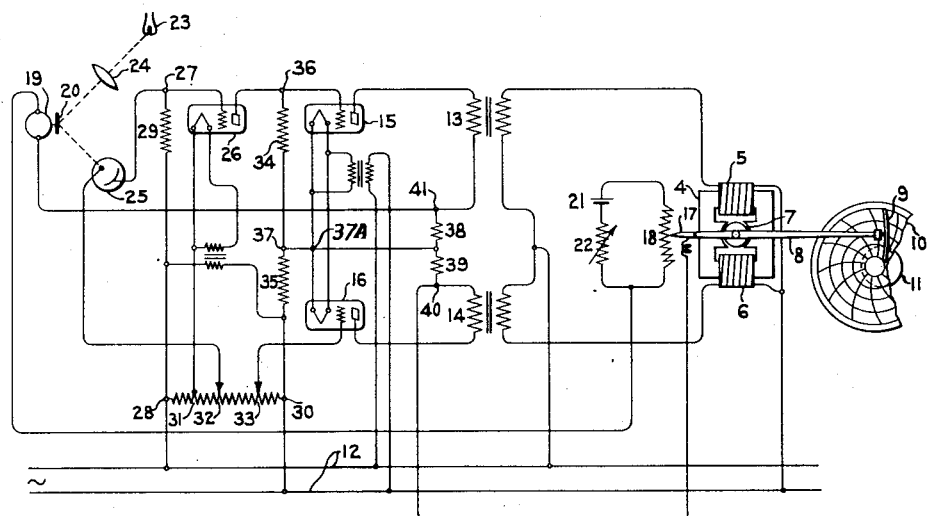
Fig. 1 is a diagrammatic arrangement of apparatus and electric circuit embodying the invention in connection with the measurement of a temperature of a heating furnace.

Referring first to Fig. 1, I therein illustrate an embodiment of my invention wherein the temperature of a metallurgical or other heating furnace 1 is measured for instantaneous reading on an index and for recording upon a continuous record chart. Fuel is supplied to the furnace through a burner 2 in well known manner. At 3 I indicate a thermocouple sensitive to temperature located within the furnace, and which temperature is to be indicated and recorded.

Primarily, when there is a deviation in temperature within the furnace, a potential relation in the thermocouple circuit is disturbed and from such lack of balance electrical magnification means are controlled for effecting the positioning of an alternating current motor to advise the value of the temperature or change in value of the temperature.

The use of thermocouples for the measurement of relatively high temperatures is well known in the art, and it is equally well known that the electrical effect obtained thereby is minute and must, of necessity, be amplified mechanically and/or electrically to do useful work, such as recording, indicating or controlling. My invention, in general, contemplates an improved electrical circuit for causing a substantial amplification of the electrical effect of the thermocouple, sensitive to and representative of the temperature within the furnace, and where such amplification may be utilized for remotely or locally recording, indicating and/or controlling variable factors in the operation of the furnace.

I have illustrated the thermocouple 3 as having its hot junction located within the furnace. By the term "hot junction" it is to be understood that I mean that junction of the thermocouple which is exposed to the temperature it is desired to evaluate, regardless of whether that temperature is of a greater or lesser magnitude than the room or reference temperature to which the other junction of the thermocouple circuit is normally exposed, and which I term for simplicity the "cold junction."

The electrical effect obtained through the thermocouple 3 indicative of variations in the temperature within the furnace, is utilized in a potentiometer circuit, as will be explained hereinafter, for positioning a sensitive galvanometer. A beam of light is reflected from a small mirror carried by the galvanometer element onto a photocell for the control of thermionic or electron discharge devices whereby the minute electrical effect in the galvanometer circuit is amplified or magnified. The magnified effect then controls an electro-magnetic device such as a reversing motor which is used as an amplified power means for positioning an indicator and recording member for advising the value of the temperature or temperature change.

I show at 4 a motor having opposed windings, 5 and 6, connected in an alternating current circuit and opposedly wound in a manner such that when the windings 5 and 6 are equally energized, a rotor 7 is not urged to rotate in either direction; but when the windings are unequally energized, rotation of the rotor 7 will occur in predetermined direction and at a speed dependent upon the unbalance of the energization of the windings. Carried by the rotor 7 for angular positioning thereby, is an indicator arm 8 adapted to cooperate with an index 9 and comprising a marking means arranged to form a continuous record upon a chart 10, driven at a uniform speed by a clock motor 11. The assembly comprising the motor 4 and indicating-recording means is adapted to advise the value of the temperature to which the thermocouple 3 is sensitive.

Upon a variation in temperature at the thermocouple 3, I effect an angular displacement of the rotor 7 directly proportional to the variation in the thermocouple potential through unbalancing the energization of the field windings 5, 6 in a manner to be explained.

The field windings 5, 6 are connected in parallel across an alternating current power source 12; and differentially in the primary circuit of transformers 13, 14 respectively; the current flow for energization of 5, 6 being controlled by varying the impedance of the primaries upon variation in the current flow through the related secondaries. The secondaries are connected respectively in circuit with electronic discharge devices 15, 16 and the arrangement is such that if one of the devices 15, 16 is passing current and the other is not passing current, then one of the field coils 5, 6 is energized and the other is de-energized, so that the rotor 7 is caused to rotate continuously at maximum speed in a given direction. If, however, both the devices 15, 16 are passing current in equal amounts, then the field windings 5, 6 are energized in equal amount and the rotor 7 is no urged to rotation in either direction. This is a condition which exists when temperature at the thermocouple 3 is steady and does not vary from a previous condition. Immediately upon a variation or change in the temperature, however, the conditions become unbalanced to an extent wherein one of the field coils 5, 6 is energized to a greater extent than the other, and the rotor 7 is caused to rotate in predetermined direction and at a speed dependent upon the amount of unbalance of the field coil energization.

When the rotor 7 moves, it positions the marking pointer 8 and simultaneously positions a contact arm 17 relative to a slide-wire resistance 18 connected in the potentiometer circuit for rebalancing the galvanometer circuit after it has departed from a balanced condition. It will be understood that the rotor 7 is provided with the necessary speed reducing gearing to move the pointer 8 and contact arm 17 at a relatively low speed. As such gearing provision is well known and understood, I have not felt it advisable to complicate the drawings by such detail.

In the circuit of the thermocouple 3 I utilize the well known zero balance or null method. In accordance with this method, the potential developed by the thermocouple is balanced against the fall of potential through a portion of the slide-wire potentiometer 18 having a resistance of known length and value per unit of length. Upon a change in potential developed by the thermocouple, a galvanometer 19 in the circuit indicates by the movement of a mirror 20 a departure from balance and effects indirectly a movement on the slide-wire potentiometer whereby a balance of potential is again effected. A constant drop of potential is maintained across the slide-wire potentiometer resistance by means of a suitable current source 21 and a calibrating resistance 22, and it is evident that the amount or length of resistance necessary to balance the potential generated by the thermocouple will then be proportional to that potential and may, by suitable calibration, be used to determine its magnitude and, correspondingly, the magnitude of the temperature to which the thermocouple is sensitive.

At 23 I indicate a light source whose rays pass through a suitable optical system 24 to fall upon the mirror 20 of the galvanometer and from the mirror be reflected onto a photocell 25. The potentiometer-galvanometer circuit including the thermocouple 3, the potential source 21, the slide-wire resistance 18, and the galvanometer 19, cooperate to apply to the photocell 25 light varying in intensity from no light to full light. The photocell 25 is connected in circuit with an electronic discharge device 26 for controlling the output of the devices 15, 16 to vary the impedance of the secondaries of the transformers 13, 14 for the purpose previously mentioned.

When there is no light falling on the photocell 25, then it conducts no current. The terminal 27 and the grid of 26 are connected to the terminal 28 through a relatively high resistance 29. The filament of 26 is connected to a voltage divider 28—30 at terminal 31. During the half-cycle in which the plate of the device 26 is positive, point 30 is positive and point 28 is negative. Then 28 is negative with respect to 31 and the filament of 26; or the grid of 26 is negative with respect to 31 and the filament of 26, so that device 26 does not carry current.

The photocell 25 is connected to the voltage divider at 32 which is positive with respect to both 28 and 31, so that if there is light on the cell it carries current proportional to the light. This current flowing through the resistance 29 produces a voltage opposite to the voltage of 28—31 and makes terminal 27 less negative than formerly, thereby allowing current to flow through 26.

This current flows from 30 through the resistances 35, 34, through the electron discharge device 26 to the terminal 31. The flow of current through the resistances 35, 34 produces a voltage drop, thereby rendering terminal 36 less positive than it was. In other words, terminal 36 is negative with respect to 37; 37 is negative with respect to 30, while with no current flow they are all at the same voltage.

Now the grid of 16 is connected to the voltage divider at 33, which is negative with respect to 30 by enough to stop 16 from carrying current when there is no flow through 35; 37 then being at the voltage of 30.

So we have the condition, with no light, no current flow through device 26, that 36 is at the voltage of 37, and current flows through 15, but 33 is negative with respect to 30 and 37 and no current flows through 16.

But with light falling on the photocell 25, current flows through 26; 36 is made negative with respect to 37 and current flow through 15 stopped; but 37 is made negative with respect to 30, or 30 is made positive with respect to 37; this positive voltage 30—37 neutralizes the negative voltage set up in 33—30, and that makes the grid of device 16 less negative, allowing current to flow through 16.

So when no light is effective upon the photocell 25, the electronic discharge device 15 passes current and the device 16 does not. When a maximum of light falls upon the photocell 25 then the device 16 passes current but device 15 does not. At all intermediate values of light the two devices 15, 16 pass proportionate amounts of current and proportionately or differentially vary the impedance of the secondaries of transformers 13, 14, resulting in a corresponding variation in energization of the field windings 5, 6 and if the energization of the windings is unbalanced then a rotation of the rotor 7 in predetermined direction and at a speed depending upon the amount of unbalance.

The current through the device 15 flows from the filament to the terminal 37A through the small resistance 38 and secondary of the transformer 13 to the plate or anode of 15. This provides a voltage across 38. Likewise current of the device 16 produces a voltage across 39. Now the resistors 38 and 39 are connected in series in the galvanometer circuit so that the voltages across 38 and 39 add algebraically.

If then the currents through devices 15 and 16 are equal, the net voltage 40—41 is zero. If 16 carries current and 15 is shut off, then there is a voltage 40—41, and vice versa an opposite voltage.

This voltage is applied to buck the thermocouple voltage and prevents the galvanometer from overswinging while at the same time allowing it to return to neutral when the motor 4 stops and both devices 15, 16 are carrying equal current.

It will be seen that any variation in temperature within the furnace 1 will result in a potential change in the thermocouple circuit, causing the galvanometer mirror 20 to swing from neutral position and allow more or less light to be effective upon the photocell 25, resulting in a rotation of the motor 4 in predetermined direction with substantially instantaneous response and great speed of action and entirely free from the time lag introduced through the now known apparatus based on periodic feeling mechanisms of a mechanical nature.

Movement of the motor 4 is not only accomplished in proper direction to record the change in temperature in the furnace 1 and to rebalance the potentiometer-galvanometer circuit through shifting of the contact 17 over the slide-wire 18, but such action is accomplished at a speed dependent upon the magnitude of the temperature variation. Thus if the temperature suddenly varies to a considerable degree, the resultant movement of the pointer 8 and of the contact arm 17 is correspondingly fast. I have found that with the apparatus and circuit described I am able to cause the pointer 8 to move completely across the recording chart in a very few seconds or substantially instantaneously to follow any temperature change to which the thermocouple may be sensitive.

Figure 2:
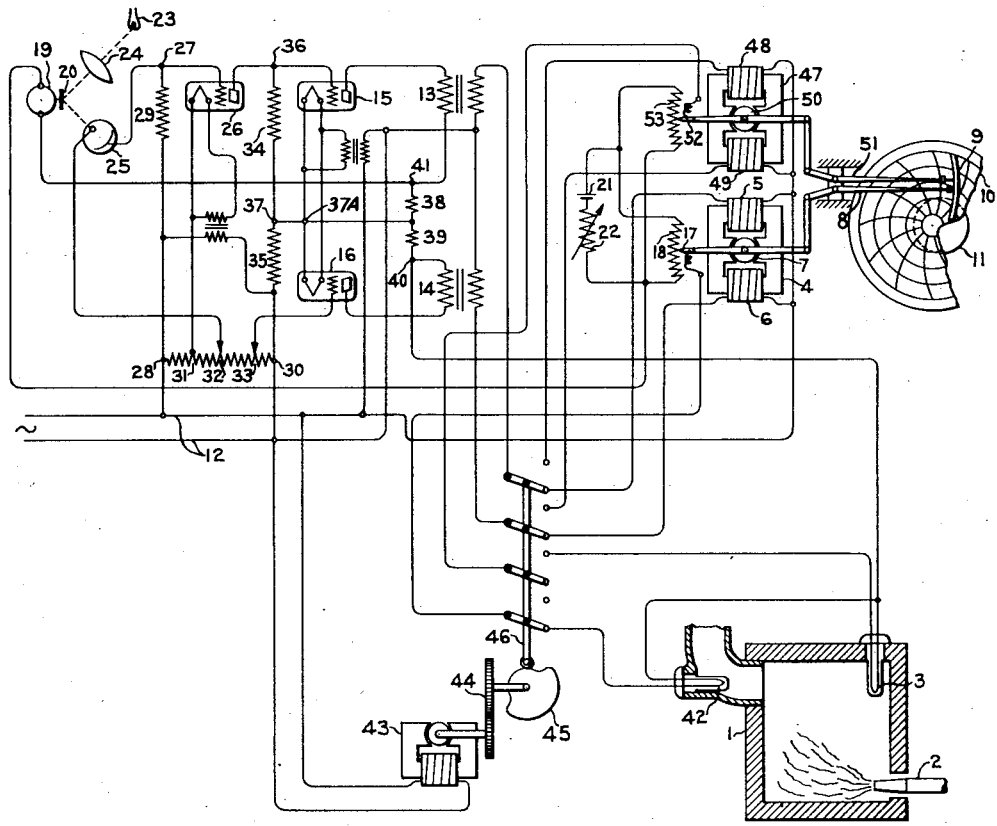
Fig. 2 is a diagrammatic arrangement of apparatus and circuit similar to Fig. 1 for recording on a single chart a plurality of temperatures of a heating furnace.

In Fig. 2 I show basically the same circuit arrangement as in Fig. 1, except that herein I provide for recording on a single chart 10 two temperatures of the furnace 1 to which thermocouples 3 and 42 respectively are sensitive.

At 43 I indicate a constantly rotating motor driving a cam 45 through the gearing 44 and adapted to periodically reciprocate a switch bar 46 for periodically opening and closing certain circuits in the electrical system.

At 47 I indicate an alternating current motor similar to the motor 4 and having opposed field windings 48, 49 and a rotor 50. The rotor is adapted to position a pointer arm 51 relative to the index 9 and recording chart 10 and simultaneously adapted to position a contact arm 52 relative to a slide-wire resistance 53, all in manner similar to the system of motor 4.

In general the arrangement is such that during half the cycle of the cam 45 the thermocouple 3 is connected to the potentiometer circuit for control of the motor 47 and through the alternate half-cycle of the cam 45 the thermocouple 42 is connected to control the motor 4. Thus at definite intervals the pointer 51 will be positioned responsive to variations in temperature at 42 and at alternate intervals the pointer 8 will be positioned responsive to any variations in temperature at the thermocouple 3. During the half-cycle of the cam 45 when the pen 51 may change its position upon the chart 9, the pen 8 will tend to draw a circle, but inasmuch as the period of rotation of the cam 45 is a matter of seconds, the result on the chart 10 will be two graphs of temperature at the locations 3 and 42 without visible indication of any period of time during which the pens are incapable of being shifted relative to the chart.

It will be readily observed that I have illustrated four contact fingers pivoted to the switch bar 46 and each of the four are pivoted at one end to an electric terminal, the arrangement being such that vertical reciprocation of the bar 46 will cause the free end of each contact finger to move from one to another of two possible engageable contacts. For example, in the shown position of the cam 45 the thermocouple 42 is connected to the terminal 40 and the slide-wire contact arm 17. Also the transformers 13, 14 are connected to the field windings 5, 6.

In the alternate position of the cam 45 the thermocouple 3 is connected to the terminal 40 and the slide-wire contact 52 while the transformers 13, 14 are connected to the field windings 48, 49. Thus when the thermocouple 3 is connected into the potentiometer circuit the field windings of the motor 47 are connected to the circuit of the transformers 13, 14 so that any variation in temperature at the thermocouple 3 will be indicated by the pointer 51.

The fact that each time a thermocouple and its corresponding motor are brought into service there also is a rebalancing of the circuit through movement of the corresponding slide-wire, means that a minimum change or movement of the motor is required when next it is connected into the circuit. The movement will amount only to that representative of the change of temperature in the meantime at that thermocouple.

Figure 3:
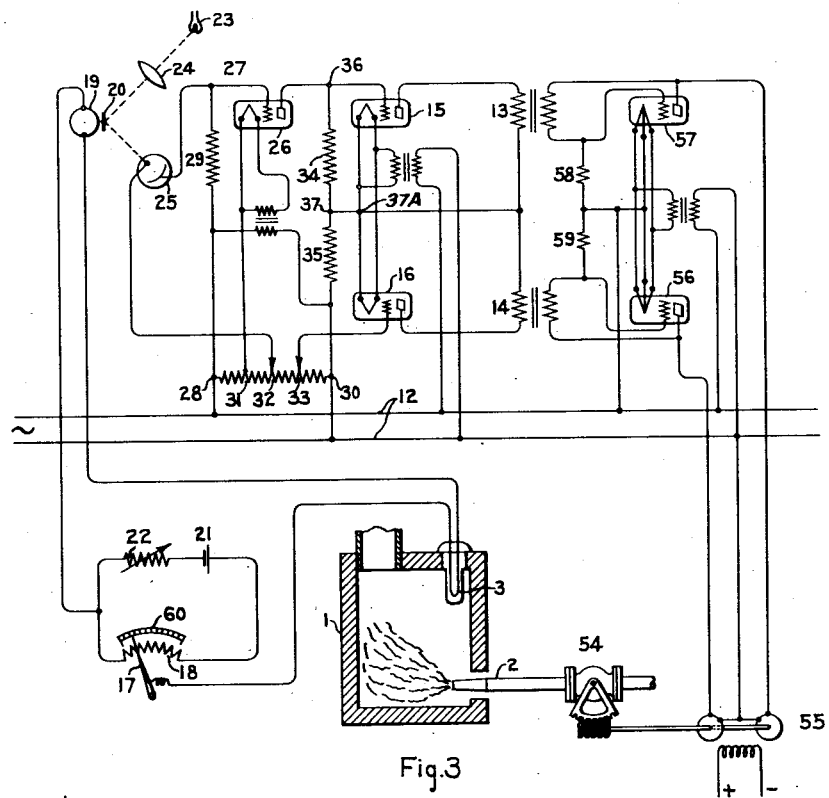
Fig. 3 is a diagrammatic showing of an embodiment of the invention in connection with the control of the heating of a furnace from a representation of a temperature thereof.

In Fig. 3 I have illustrated the basic arrangement of circuits of Figs. 1 and 2, except that I herein am controlling the supply of fuel to the burner 2 rather than recording the temperature at the thermocouple 3, although I might if desired additionally connect a recording mechanism into the circuit of Fig. 3 equally as well. I illustrate a fuel control valve 54 adapted to be positioned by a motor 55 in desired direction and at different speeds of regulation. The motor 55 is shown as having direct current field energization and comprising two armatures mounted on the same shaft and so wound as to oppose each other in rotation. If equal currents flow through the two armatures no rotation of the shaft results, whereas any unbalance in current flow through the two armatures results in shaft rotation in a predetermined direction and at a speed dependent upon the magnitude of unbalance.

The armatures are connected in an alternating current circuit controlled by electronic discharge devices 56, 57 and receive pulsating direct current resulting from the half-way rectification by the devices 56, 57 of the alternating current.

From the circuit of Fig. 3 I have omitted, for the sake of simplicity, the anti-hunting resistances 38, 39 although it will be understood that these may be added if desired. I show the transformers 13, 14 as in the previous illustrations, and it will be understood that with the secondary of such a transformer open, all current flowing through the primary is the magnetizing current in the primary and that is at approximately 90° lag with respect to the voltage, which means that the grid of the device 56 or of the device 57 is approximately 90° out of phase, lagging with respect to the current, and the plate-filament circuit of the electronic discharge device passes practically no current. I have previously explained how the primary arrangement of the circuit varies the current flow through the secondaries of the transformers 13, 14 dependent upon the amount of light reaching the photocell 25. As I vary the current in the secondary of one of the transformers 13, 14, I draw an in-phase component of current in the primary which, added to the magnetizing current, vectorially produces a change in phase of the primary current and that through a resistance 58 or 59 produces a corresponding change in phase of the grid voltage of the electronic discharge device 57 or 56 respectively. Such change in phase varies the turning-on point of the device for each half-cycle of the alternating current, and thereby determines the current flow to each of the two armatures of the motor 55.

Thus it will be seen that dependent upon the amount of light reaching the photocell 25, the current flow through the transformer secondaries 13, 14 will vary, and inductively the current flow through the primaries of the transformers will also vary, resulting in a change in phase of the voltage on the grids of the electronic discharge devices 57, 56 controlling the motor armatures 55. If the phase of the voltage on the grids of the two devices is the same, then the same current reaches both armatures and the motor is not urged to rotation. If the current flow in the secondaries of the transformers 13, 14 is not equal, then such inequality is reflected in the phase of the grids of devices 57, 56 and the current flow in the armatures of the motor 55 is unbalanced, and differentially the motor will rotate in predetermined direction and at a speed dependent upon the amount of unbalance.

The thermocouple 3 connected in a potentiometer circuit of which 18 represents the slide-wire, governs the movement of the galvanometer 19 and thereby the amount of light reaching the photocell 25. I illustrate in Fig. 3 the slide-wire contact arm 17 being movable by hand to a position representative, relative to the index 60, of the temperature I desire to maintain at the thermocouple 3. If the temperature at the thermocouple 3 departs from the desired value, then the potentiometer circuit becomes unbalanced, the galvanometer 19 moves the mirror 20, resulting in a change in throttling positioning of the valve 54. This is what is known as a floating control arrangement, wherein there is no definite relation between the position of the contact arm 17 representative of temperature and the position of the valve 54. The arm 17 is manually moved relative to the slide-wire 18 and the index 60 to a temperature which is desirably to be maintained at the thermocouple 3. Thereafter any departure from such temperature results, as previously described, in positioning of the valve 54, and such positioning or throttling of the valve will continue so long as the actual temperature at 3 is not that which is desired.

Figure 4:
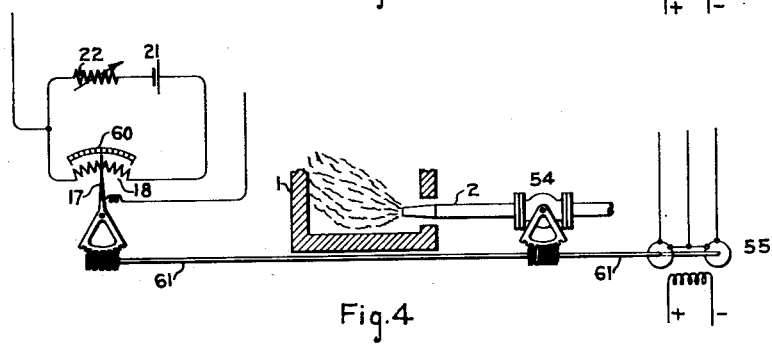
Fig. 4 shows a modification of the arrangement of Fig. 3.

In Fig. 4 I illustrate what is known as a geared control arrangement wherein there is a fuel supply valve position for every temperature and in common and well known manner the range may be varied through adjustment such as the resistance 22. That is, the circuit may be so calibrated that full travel of the fuel regulating valve 54 may be accomplished for only a small variation in temperature relative to a predetermined temperature, or for a relatively wider variation in temperature. I show the shaft 61 of the motor 55 not only adapted to position the valve 54 but extended to engage and position the contact arm 17 so that there will be a corresponding valve position for every pointer position, or for every temperature. The arrangement is such that for every movement of the shaft 61 to vary the fuel supply there is a corresponding movement of the arm 17 over the slide-wire 18 in a balancing or follow-up direction.

Figure 5:
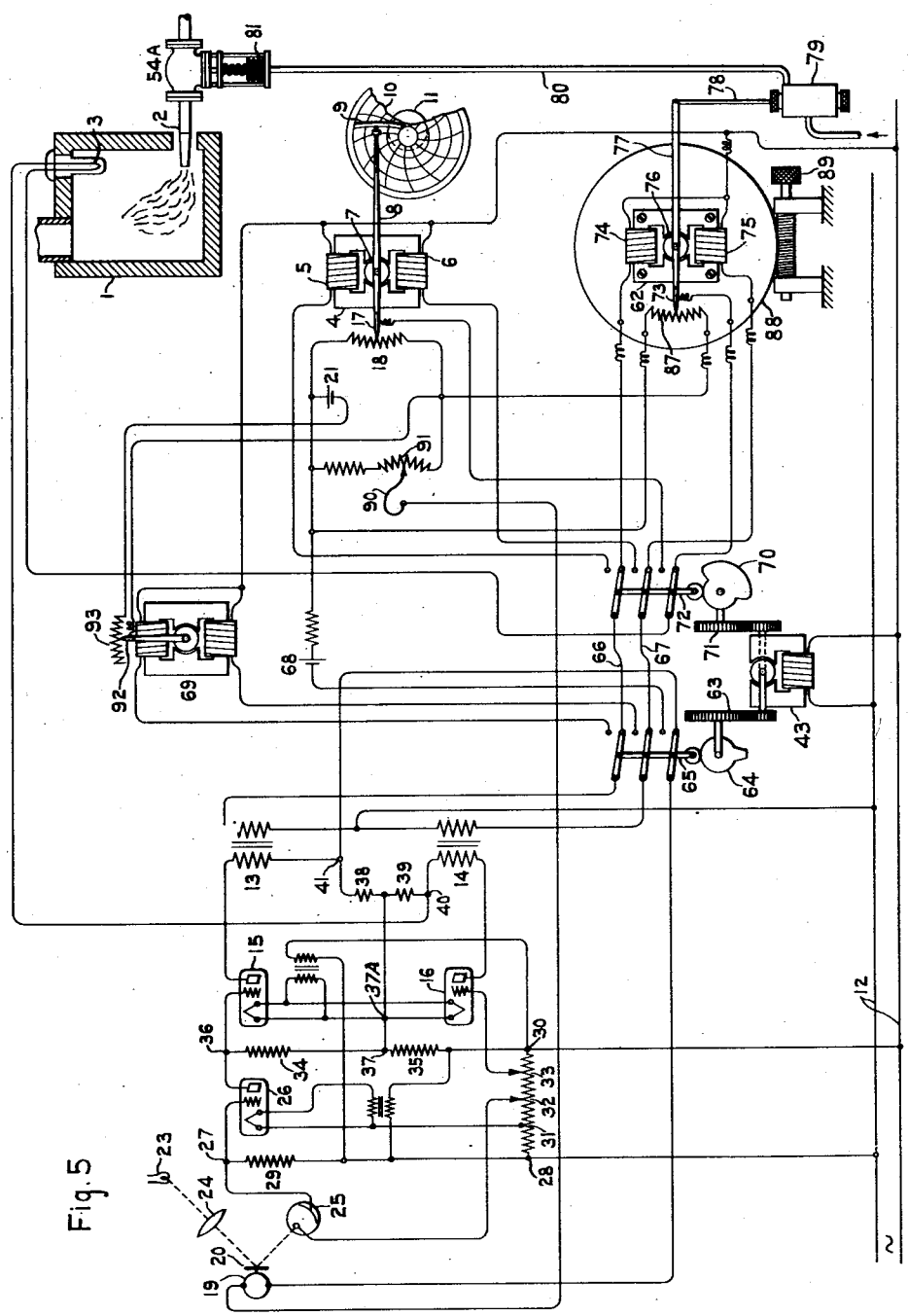
Fig. 5 illustrates in diagrammatic fashion the recording of a temperature within a heating furnace and the control of the heating of the furnace.

In Fig. 5 I show an adaptation of the primary circuit of my invention to the alternate recording and control of the temperature at the thermocouple 3. Periodically I make the motor 4 effective for indicating the temperature at the thermocouple 3 upon the index 9 and recording it on the chart 10. Alternately periodically I make the reversing motor 62 effective for positioning the fuel supply valve 54A. The frequency of these alternations may be such that there is, to all intents and purposes, a continuous recording on the chart 10 of the temperature, and a continuous, substantially simultaneous control of the fuel valve 54A. In other words, I have substantially a simultaneous recording and controlling of the temperature within the furnace 1.

The motor 43 connected across the power source 12 runs continuously and drives a cam 64, through gearing 63, to periodically reciprocate thereby, a switch bar 65 adapted to move three contact bars about pivoted ends to alternately connect each of the bars to either of two circuits. In the shown position, the galvanometer 19 is connected to the terminal 41, while the primaries of the transformers 13, 14 are connected to two conductors 66, 67.

In the alternate position of reciprocation of the switch bar 65, the galvanometer 19 is connected to a source of potential 68, while the primaries of the transformers 13, 14 are connected to the two fields of a reversing motor 69.

The motor 43 continuously drives a cam 70, through gearing 71, to periodically reciprocate a switch bar 72 of a type similar to 65. The cam 70, however, is preferably of a different shape than the cam 64, and the speed of the gearing 71 may be different than that of the gearing 63. The lowermost contact bar reciprocated by the cam 70, is connected to one terminal of the thermocouple 3. The other two contact bars are connected to the conductors 66, 67. In the shown position, the thermocouple 3 is connected to a slide wire contact arm 73, while the conductors 66, 67 are connected respectively to the fields 74, 75 of the motor 62. In the other position of reciprocation, the thermocouple is connected to the slide wire contact arm 17 of the motor 4, while the conductors 66, 67 are connected respectively to the fields 5 and 6 of the motor 4. Thus, through one-half of the cycle of the cam 70, the thermocouple 3 and the transformers 13, 14 are connected to record the temperature upon the chart 10, while during the other half cycle of the cam 70, they are connected to the control motor 62 for positioning the fuel supply valve 54A.

I will now explain the control, by fluid pressure means, of the regulating valve 54A from a positioning of the rotor 76 by the motor 62. The rotor 76 angularly moves an arm 77, at one end comprising a contact finger 73, while at the other end is pivotally suspended a link 78 comprising a pilot moved vertically relative to a pilot casing 79 for control of air under pressure admitted to the casing 79 from a source of supply (not shown). The novel features of the pilot valve assembly provide a fluid pressure to control the valve 54A, dependent upon the axial positioning of the pilot stem 78 and in turn upon the positioning of the rotor 76.

Air under pressure admitted to the casing 79 from the source, leaves the casing 79 through a pipe 80 to a metallic bellows 81, spring opposed, for positioning the valve 54A. The throttled position of the valve 54A in the fuel supply line is then proportionate to the pressure effective within the bellows 81 and in turn to the pressure supplied to the outlet of the pilot 79, in turn controlled by the positioning of the rotor 76.

Figure 6:
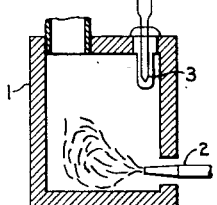
Fig. 6 is a sectional elevation to enlarged scale of an air pilot valve incorporated in the general showing of Fig. 5.
Figure 6:
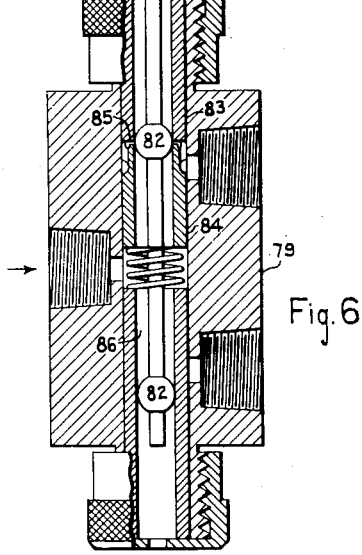

I show at Fig. 6, the arrangement and construction of the pilot valve assembly in section and to enlarged scale.

As is common in this art, the pilot comprises a stem 78 having enlargements 82 known as lands, positioned axially in the pilot casing 79 relative to ports for controlling the passage of air or other desirable pressure fluid. Air under pressure is admitted to the interior of the pilot casing 79 from a point of supply and the positioning therein of the pilot 78 controls air pressure in the discharge pipe 80. Within the casing 79 are sleeves 83, 84 recessed slightly at joining points 85, to provide a thin, annular port adjacent the upper of the two lands 82 and which port communicates by proper passages with the outlet pipe 80.

The land 82 is shown as spherical, although it may be formed of any desired contour such as conical or slow tapered. This pilot has a number of features which distinguish it clearly from those pilot valves now known in the art which are generally of a type controlling the quantity of fluid through the related ports and are usually of a type which must be returned, either through movement of the pilot stem or of the pilot sleeve, to a shutoff position in order that the functioning of the device as a whole will be accomplished in desired manner. The present pilot is in the nature of a positioning device, giving a definite loading pressure at the port 85 and the outlet pipe 80 for each axial position of the pilot stem 78 rather than a quantity control of flow through the port.

With a constant bleed of air past the lands 82 to the atmosphere and full supply pressure at the interior of the sleeve between the lands, there will be a definite gradation of pressure from the space 86 interior of the sleeves and surrounding the stem 78, to the point of least clearance between the lands 82 and the sleeves, namely, the point of greatest diameter of the lands 82.

Surrounding the upper land in the shown position is the narrow outlet or discharge port 85 which may be only a few thousandths of an inch in a diameter axial to the assembly. A definite air pressure will exist in the port 85, depending upon the axial positioning of the adjacent land 82 and for every point of such positioning (upward in Fig. 6) until full pressure of the space 86 is effective at 80.

The control of pressure fluid by the pilot is in the nature of supplying to the bellows 81 a pressure accurately depending upon the axial positioning of the pilot within the casing and wherein such pressure-position relation may be definitely controlled by the shaping of the land 82. Certain features of the pilot valve and fluid pressure control system are disclosed and claimed in the co-pending application Serial No. 658,376 of Clarence Johnson, filed in the U. S. Patent Office Feb. 24, 1933, and having the same assignee as the present invention, now Patent No. 2,054,464.

In will be readily understood that the rotor 76 is caused to move when there are changes in the temperature at the thermocouple 3 and such movement results in a variation of air pressure within the metallic bellows 81 for positioning the fuel valve 54A. The contact arm 73 is moved relative to the slide wire resistance 87 for balancing the potentiometer circuit.

In order that I may vary the predetermined desirable temperature to be maintained at the thermocouple 3, I arrange adjustable means for moving the motor 62 and the slide wire resistance 87 as a whole relative to a fixed point and relative to the pilot casing 79. I provide that the motor 62 and slide wire resistance 87 be mounted upon a base 88 in a manner pivoted substantially around the center of the rotor 76 and capable of rotation around such center through the agency of a screw 89 threaded through fixed parts. I may desirably calibrate the base 88 relative to the screw 89 so that I can move the same to an indicated desirable temperature to be maintained at the thermocouple 3 and vary such predetermined temperature as desired through turning the screw 89.

As the cam 70 rotates for approximately 180° of its rotation, the thermocouple is made effective to control the motor 62 for positioning the fuel supply valve 54A. During the other 180° of rotation of the cam 70, the thermocouple is effective to cause a positioning of the motor 4 and thereby indicate and record relative to the index 9 and chart 10 the temperature at the thermocouple 3. By making the gearing 71 of proper ratio, I can switch the thermocouple from the motor 4 to the motor 62 as slowly or rapidly as I may desire and make the recording and controlling substantially simultaneously in operation.

I illustrate in Fig. 5 an arrangement including cold junction compensation. While cold junction compensation of a galvanometer-potentiometer circuit is well known in general, I have illustrated and will describe an improved form of such compensation. The novel device for compensating for variations in cold junction temperature is of a simple construction and does not in any way impair the accuracy of the potentiometer method of measuring potentials. In accordance with my improved method, I automatically place in parallel with the potentiometer potential, against which is balanced the thermocouple potential, an amount equal to the change in the thermocouple potential due to a variation in the temperature of the cold junction. I show a contact arm 90 formed as a bimetallic spiral and adapted to engage a slide wire resistance 91 connected to the potentiometer circuit in parallel with the slide wire 18. Upon a variation in the temperature of the cold junction of the thermocouple, to which temperature the bimetallic spiral is exposed, the contact tip 90 will move along the resistance 91 to vary the point on such resistance to which the galvanometer 19 is connected.

The accuracy of a potentiometer may be materially affected through change in the potential drop across the slide wire resistance. It is desirable then to periodically standardize or compare the potential drop across the slide wire resistance with a standard drop or a different potential of known value. In this connection, I provide the constantly rotated cam 64 which travels at a speed comparatively slower than the cam 70 and once during each revolution reciprocates the contact bar 65 to an upper position. The gear ratio may be such that the cam 64 makes one revolution per day or at any interval desired.

Such reciprocation causes the free end of each of the three previously mentioned contact fingers to move from a lower to an upper contact. The lowermost finger switches one of the leads of the galvanometer 19 from the terminal 41 to a source of potential 68. The uppermost two contact fingers switch the primaries of the transformers 13, 14 from the conductors 66, 67 to connect to the field of the motor 69. The result is that when the switch bar 65 is in its uppermost position, with the galvanometer connected to the potential source 68 and the transformers 13, 14 connected to the motor 69, if there is an unbalance through, for example, variation in the potential source 21, then the motor 69 will be caused to move a contact arm 92 relative to a slide wire 93 which is inserted in parallel with the resistance 18. The source of potential 68 is the standardizing cell and the result is that once each revolution of the cam 64, the thermocouple 3 and the motors 4, 62 are disconnected from the potentiometer circuit and in their place is connected the standardizing cell 68 and the motor 69. Unless the potentials impressed on the galvanometer at this time are of equal magnitude, indicating a definite predetermined difference in potential between certain junction points of the circuit, the galvanometer will deflect in direction and amount dependent upon the preponderance of one potential over the other and, in a manner as described with reference to the operation of the motors 4, 62, the motor 62 will be operated to vary the amount of the resistance 93 in the potentiometer circuit and the galvanometer needle is rebalanced.

While I have illustrated the invention as relating particularly to the measurement of temperature and the use of thermocouples, still I contemplate that the arrangement may be utilized for the measurement and control of other variables or characteristics in the operation of apparatus, and which may be of physical, chemical, thermal, electrical or other nature. Such variables may be flow, temperature, pressure or ratio of variables, or quantities, qualities or conditions.

While in the description and appended claims, for the sake of simplicity and clearness I have used the terms "slide wire resistance" and "slide wire potentiometer", it is to be understood that I include in this term any variable resistance capable of performing the same function.

Although I have illustrated the control by the motor 62 of a fluid pressure such as air, I may equally as well use water, oil or any other of the well-known pressure fluids.

While I have illustrated and described certain preferred embodiments of my invention, it is to be understood that I am not to be limited thereby except as to the claims in view of prior art.

Certain features of my invention disclosed herein and pertaining particularly to the cold junction compensator have been divided out and form the subject matter of my copending application Serial No. 144,909, filed May 26, 1937.

What I claim as new, and desire to secure by Letters Patent of the United States, is:—

1. A temperature measuring apparatus comprising in combination, a photocell responsive to variations in applied light, a temperature responsive means for causing variations in applied light, a first electron discharge device controlled by the photocell, and a plurality of electron discharge devices simultaneously controlled by the first device to produce concurrent opposite variations in current in the output circuits proportional to the magnitude of the temperature variation.

2. A temperature measuring apparatus comprising in combination, a potentiometer circuit for positioning a galvanometer upon changes in temperature, photo-sensitive means adapted to have a current passage varying responsive to galvanometer movement, a first electron discharge device controlled by said current passage, a plurality of electron discharge devices differentially controlled by the first electron device, and a plurality of transformers the current flow through each of which is controlled by one of the plurality of electron devices.

3. A temperature measuring device comprising in combination, a plurality of electron discharge devices each having an input and an output circuit, temperature responsive means for controlling energization of the input circuit, a plurality of transformers, the secondary of each transformer connected in the output circuit of a related electron device whereby the impedance in said secondary is varied according to variations in current flow through the related electron device, a motor having a rotor and a plurality of field windings connected in the primary circuits of said transformers and for exerting opposing forces on said rotor responsive to the current flow in said primaries, and an indicator of temperature positioned by the rotor.

4. In combination, a photocell, a plurality of electron discharge devices each having an input and an output circuit, the magnitude of the current passed by said photocell differentially selectively controlling the energization of said input circuits, operating mechanism actuated by the current in said output circuits, and means under the control of said operating mechanism for varying the current flow through said photocell.

5. The combination with a heating device, of means separately responsive to a plurality of temperatures thereof, photo-sensitive means commonly under the control of all of said first-named means, recording mechanism, a recording marker for each of said temperatures and all cooperating with the recording mechanism, and means alternately making effective each of the first-named means upon its related marker through the agency of the common photo-sensitive means.

6. The combination with a heating apparatus, of photo-sensitive means controlled responsive to a temperature of said apparatus, an electron discharge device having an input and an output circuit, said photo-sensitive means adapted to control said input circuit, indicating means controlled by the current in said output circuit for advising the temperature, and fluid pressure actuated control means for said heating apparatus and controlled by the current in the output circuit, said indicating means and control means operating periodically alternately.

7. In a control system, in combination, means for applying an agent to produce or maintain a predetermined condition, fluid pressure actuated control means for varying the rate of application of the agent, a plurality of electron discharge devices each having an input and an output circuit, said control means positioned by changes in current in the output circuits, and photo-sensitive means responsive to departure from the predetermined condition for controlling the input circuits in accordance with the rate of change of said condition from or toward the predetermined value.

8. In combination, a heating device provided with fuel supply means, means for producing a potential representative of a temperature of said device, photosensitive means responsive to said second-named means, a potentiometer, an indicating mechanism, fluid pressure actuated means for controlling the rate of fuel supply to said device, and means for periodically during successive increments of time bringing said indicating mechanism and during alternate periods of time said control means under the joint control of said potentiometer and said photosensitive means.

9. In a control system for producing or maintaining a predetermined condition, in combination, a member having a neutral position and movable therefrom in accordance with deviations from said predetermined condition, photo-sensitive means controlled by movement of said member, an electron discharge device controlled by said photo-sensitive means, fluid pressure actuated regulating means for varying the application of an agent to maintain said condition controlled by said electron discharge device, and means controlled by the electron discharge device for restoring said member to the neutral position before said predetermined condition is established.

10. In a control system, in combination, means for applying an agent to produce or maintain a predetermined condition, fluid pressure control means for varying the rate of application of said agent, an electron discharge device having an input and an output circuit, said fluid pressure actuated control means connected in the output circuit of the device, photo-sensitive means responsive to departure from said predetermined condition for controlling the input circuit of said device in accordance with the rate of change from or to said predetermined condition.

11. In a control system, in combination, means for applying an agent to produce or maintain a predetermined condition, fluid pressure actuated control means for varying the rate of application of said agent, electro-magnetic means for controlling said fluid pressure actuated means, a plurality of electron discharge devices each having an input and an output circuit, said electro-magnetic means connected in the output circuits of the devices, and a photo-sensitive means responsive to departure from said predetermined condition for controlling the input circuits of said devices in accordance with the rate of change from or to said predetermined condition.

12. In combination, a deflecting member having a neutral position, photo-sensitive means controlled by the deflecting member for producing a potential in accordance with the sense and extent of departure of the deflecting member from the neutral position, a pair of electron discharge devices, means controlled by the potential for concurrently biasing the grids of said devices in opposite directions in proportion to the magnitude of the potential, electro-magnetic means controlled by the difference in current in the cathode-anode circuits of said devices, and means actuated by the last named means for restoring said movable member to the neutral position after departure therefrom.

13. In combination, a deflecting member.

photo-sensitive means controlled by the deflecting member for producing a potential varying in accordance with the position of the deflecting member, an electron discharge device, means controlled by the potential for biasing the grid of the device to decrease the resistance of the cathode-anode circuit upon increase of the potential, a second electron discharge device, means controlled by the potential for biasing the grid of the second device to decrease the resistance of the cathode-anode circuit upon decrease of the potential, and electro-magnetic means controlled by the difference in currents in the cathode-anode circuits of said devices.

14. In combination, means for producing a potential in accordance with the magnitude of a condition, a potentiometer, a galvanometer having a neutral position connected in circuit with said means and potentiometer, means controlled by the galvanometer for producing an electrical current varying in sense and extent in accordance with the sense and extent of departure of the galvanometer from the neutral position, and a resistance traversed by said current connected into the galvanometer circuit for producing a potential opposing changes in the potential produced by the first named means.

15. In combination, an electric circuit, means for producing a current in said circuit in accordance with the magnitude of a variable, a plurality of electron discharge devices each having an input and an output circuit, and means in said first named circuit for controlling the input circuits of said devices selectively in accordance with the magnitude of the current.

16. A temperature measuring apparatus comprising in combination, photo-sensitive means controlled responsive to changes in the temperature to be measured, a plurality of electron discharge devices, and means controlled by the current passed by said first named means for controlling said electron discharge devices to produce concurrent variations in the current in the output circuits of said devices.

17. A temperature measuring apparatus comprising in combination, photo-sensitive means controlled responsive to changes in the temperature to be measured, a plurality of electron discharge devices, and means controlled by the current passed by said first named means for controlling said electron discharge devices to produce concurrent variations in opposite senses in the current in the output circuits of said devices.

18. A temperature measuring apparatus comprising in combination, temperature sensitive means for positioning a galvanometer upon change in temperature, photo-sensitive means to produce a first current varying responsive to galvanometer movement, a first electron discharge device controlled by the first current to produce a second current in accordance with the first current, and a plurality of electron discharge devices differentially controlled in accordance with the magnitude of the second current.

19. A temperature measuring apparatus comprising in combination, a potentiometer circuit for positioning a galvanometer upon changes in temperature, photo-sensitive means to produce a first current varying responsive to galvanometer movement, a first electron discharge device controlled by the first current to produce a second current in accordance with the first current, and a plurality of electron discharge devices concurrently controlled in opposite senses in accordance with the magnitude of the second current.

20. A temperature measuring apparatus comprising in combination, a potentiometer circuit for positioning a galvanometer upon changes in temperature, photo-sensitive means to produce a first current varying responsive to galvanometer movement, a first electron discharge device controlled by the first current to produce a second current in accordance with the first current, a plurality of electron discharge devices, and means for biasing the grids of said plurality of electron discharge devices in opposite senses in accordance with the magnitude of the second current.

21. A motor having opposed fields which when equally energized do not urge the motor to rotation, a plurality of electron discharge devices for controlling the energization of the fields, photo-sensitive means, and means under the control of said photo-sensitive means for selectively controlling said electron discharge devices in accordance with the magnitude of the current in the output circuit of said photo-sensitive means.

22. A motor having opposed fields which when equally energized do not urge the motor to rotation, the motor adapted to advise the value of a variable to be measured, a plurality of electron discharge devices differentially controlling the energization of the fields, photo-sensitive means, means under the control of said photo-sensitive means for selectively controlling said electron discharge devices in accordance with the magnitude of the current in the output circuit of said photo-sensitive means, and means sensitive to the instantaneous value of a variable for controlling the input circuit of said photo-sensitive means.

23. The combination with a thermocouple, of a motor having normally equally energized opposed windings, photo-sensitive means under the control of the thermocouple, and means inductively regulating the energization of said opposed windings selectively controlled in accordance with the magnitude of the current in the output circuit of said photo-sensitive means.

24. The combination with means for producing an electrical effect representative of the magnitude of a variable, of photo-sensitive means responsive to changes in said electrical effect, a motor having normally equally energized opposed windings, and means inductively regulating the energization of said windings selectively controlled in accordance with the magnitude of the current in the output circuit of said photo-sensitive means.

25. The combination with a heating apparatus, of photo-sensitive means controlled responsive to a temperature of said apparatus, an electron discharge device having an input and an output circuit, said photo-sensitive means adapted to control said input circuit, indicating means controlled by the current in said output circuit for advising the temperature, and control means for said heating apparatus controlled by the current in the output circuit, said indicating means and control means operating periodically alternately.

26. In a control system, in combination, means for applying an agent to produce or maintain a predetermined condition, control means for varying the rate of application of the agent, a plurality of electron discharge devices each having an input and an output circuit, said control means positioned by changes in current in the output circuits, and photo-sensitive means responsive to departure from the predetermined condition for controlling the input circuits in accordance with the rate of change of said condition from or toward a predetermined value.

27. In a control system for producing or maintaining a predetermined condition, in combination, a member having a neutral position and movable therefrom in accordance with deviations from said predetermined condition, photo-sensitive means controlled by movement of said member, an electron discharge device controlled by said photo-sensitive means, regulating means controlled by said electron discharge device for varying the application of an agent to maintain said condition, and means controlled by the electron discharge device for restoring said member to the neutral position before said predetermined condition is established.

28. In a control system, in combination, means for applying an agent to produce or maintain a predetermined condition, control means for varying the rate of application of said agent, an electron discharge device having an input and an output circuit, said control means connected in the output circuit of the device, and photo-sensitive means responsive to departure from said predetermined condition for controlling the input circuit of said device in accordance with the rate of change from or to said predetermined condition.

29. In a control system, in combination, means for applying an agent to produce or maintain a predetermined condition, control means for varying the rate of application of said agent, electromagnetic means for controlling said control means, a plurality of electron discharge devices each having an input and an output circuit, said electromagnetic means connected in the output circuit of the devices, and a photo-sensitive means responsive to departure from said predetermined condition for controlling the input circuit of said devices in accordance with the rate of change from or to said predetermined condition.

30. In combination, a movable member, means for positioning said member upon change in the magnitude of a variable, photo-sensitive means to produce a first current varying responsive to movements of said movable member, a first electron discharge device controlled by the first current to produce a second current in accordance with the first current, and a plurality of electron discharge devices differentially controlled in accordance with the magnitude of the second current.

JOHN D. RYDER.